Aug. 3, 1965 G. F. MARETTE 3,198,938

SCALE FACTOR DEVICE

Filed May 9, 1962 8 Sheets-Sheet 1

INVENTOR
GEORGE F. MARETTE
BY Griffin and Stokes
ATTORNEYS

Aug. 3, 1965 G. F. MARETTE 3,198,938

SCALE FACTOR DEVICE

Filed May 9, 1962 8 Sheets-Sheet 2

Aug. 3, 1965 G. F. MARETTE 3,198,938

SCALE FACTOR DEVICE

Filed May 9, 1962 8 Sheets-Sheet 4

Aug. 3, 1965 G. F. MARETTE 3,198,938

SCALE FACTOR DEVICE

Filed May 9, 1962 8 Sheets-Sheet 5

United States Patent Office 3,198,938
Patented Aug. 3, 1965

3,198,938

SCALE FACTOR DEVICE

George F. Marette, Minneapolis, Minn., assignor to Sperry Rand Corporation, New York, N.Y., a corporation of Delaware Filed May 9, 1962, Ser. No. 193,526
14 Claims. (Cl. 235—164)

The present invention relates to scale factor devices suitable for use in the normalizer circuits of data processors. More particularly this invention relates to a device for generating the scale factor of a binary number in response to the carry signals generated in the carry pyramid of an accumulator.

Scale-factoring or normalizing is an essential operation in floating binal (decimal) point computing devices. In these devices the binary numbers are usually shifted to the left until a significant digit is adjacent the sign or leftmost digit. The binal or decimal point is assumed to be located immediately to the right of the sign digit. When a number is shifted in this manner a count must be kept of the number of places the number has been shifted so that when an arithmetic operation such as addition is performed the corresponding orders of the two operands are added.

Assume for example that a binary zero in the leftmost position represents a positive number and a binary one in the leftmost position represents a negative number. An unscaled positive binary number may be represented as follows:

$$2^6\ 2^5\ 2^4\ 2^3\ 2^2\ 2^1\ 2^0$$

$$0.0\ 0\ 0\ 1\ 0\ 1$$

The sign bit appears in the $2^6$ order. The same number after a scale factor operation is represented as follows. The sign digit is not shifted in the scale factor operation.

$$2^6\ 2^5\ 2^4\ 2^3\ 2^2\ 2^1\ 2^0$$

$$0.1\ 0\ 1\ 0\ 0\ 0$$

The scale factor associated with this number is three since the most significant digit originally present in binary order $2^2$ has been shifted three binary orders to the left and now appears adjacent the sign bit.

For negative numbers expressed in binary ones complement notation the zeros represent significant digits. Thus, the negative number 1.111010 is left shifted until the order adjacent the sign contains a binary zero. The result is 1.010 and the scale factor is again three since the significant digits are shifted three orders to the left.

A common practice in former scale factor operations has been to compare the sign digit with the digit next to it and to shift the binary number if the two digits are equal. This operation is repeated and the shifts counted until the two digits are not equal at which time the number of shifts indicates the scale factor. While this is a simple and economical way of determining a scale factor it is a time consuming operation, particularly when the binary numbers vary over a wide range.

In order to conserve time some computers of the prior art are provided with large translators to which a number may be applied to determine its scale factor. These translators require many components and are quite expensive.

Accordingly, an object of the present invention is to provide a scale factor generator which requires relatively few circuits in addition to those already present in some computers yet generates scale factors in a relatively fast manner.

As subsequently explained, some computers of the prior art perform the addition of two binary numbers as a sequence of two half-add operations. Each half-add operation is performed by a half-adder. The first half-adder half-adds one operand to the other operand to develop a set of sum digits and a set of carry digits. The sum and carry digits are applied to a carry pyramid which effectively propagates the carry digits to the left and end around. To speed up the carry propagation the sum digits and carry digits are divided into a plurality of groups. Each group of sum and carry digits has a group carry circuit and an intrinsic carry circuit in the carry pyramid. The carries produced by the carry pyramid are then half-added to the sum digits to obtain the sum of the two operands.

An object of the present invention is to provide means for generating the scale factor of a binary number in response to carry signals generated in an adder of the type described above.

More particularly, an object of the present invention is to provide means responsive to the carry signals generated when the absolute value of a binary number is half-added to zero for generating the scale factor of the binary number.

In adders of the type described above each group carry circuit of the carry pyramid generates a group carry signal if there is a carry generated by a stage within the group that cannot be satisfied by inserting it in one of the stages within the group to the left of the stage which generates the carry. Also, each group carry circuit generates a group carry enable signal if none of the stages within the group can absorb a carry applied to the group from a lower order group. As will be shown subsequently, it has been found that if the absolute value of a binary number is half-added to zero the highest order group carry circuit which does not produce a group carry enable signal is the group containing the most significant digit of the binary number. Furthermore, an interstage carry signal is generated by one or more stages associated with the group which does not produce the group carry enable signal, the highest order of these stages being the one associated with the most significant digit of the binary number.

Therefore, a further object of this invention is to provide means responsive to the group carry enable signals and carry signals generated when the absolute value of a binary number is half-added to zero for generating the scale factor of the binary number.

An object of the present invention is to provide first means responsive to the group carry enable signals of a carry pyramid for generating a signal indicating the group receiving the most significant digit of a binary number, second means responsive to said first means for enabling the carry circuits of said group, and third means responsive to said first means and said enabled carry circuits for generating an indication of the scale factor of the binary number.

Other computers of the prior art employ subtractive logic to perform an addition operation. That is, the first half-adder subtracts the complement of one operand from the other operand to develop a set of difference digits and a set of borrow digits. The difference digits and borrow digits are applied to a borrow pyramid which propagates the borrows to the left and end around. To speed up the borrow propagation the difference digits and borrow digits are divided into a plurality of groups. Each group of difference and borrow digits has a group borrow circuit and an intrinsic borrow circuit in the borrow pyramid. The borrows produced by the borrow pyramid are then half-subtracted from the difference digits to obtain the sum of the two operands.

Therefore, an object of the present invention is to provide means for generating the scale factor of a binary number in response to borrow signals generated in an adder employing subtractive logic.

More particularly, an object of the present invention is to provide means responsive to the borrows generated when the negative absolute value of a binary number is half-added to zero in a half-adder employing subtractive logic for generating the scale factor of the binary number.

In adders employing subtractive logic each group borrow circuit of the borrow pyramid generates a group borrow signal if there is a borrow generated by a stage within the group that cannot be satisfied by finding a binary one difference digit in one of the stages within the group to the left of the stage which generates the borrow. Also, each borrow circuit generates a group borrow enable signal if none of the stages within the group can absorb the borrow applied to the group from a lower order group. As will be shown subsequently, it has been found that if the negative absolute value of a binary number is half-added to zero in a half-adder employing subtractive logic the highest order group borrow circuit which does not produce a group borrow enable signal is the group containing the most significant digit of the binary number. Furthermore, an interstage borrow signal is generated by one or more stages associated with the group which does not produce the group borrow enable signal, the highest order of these stages being the one associated with the most significant digit of the binary number.

A further object of this invention is to provide means responsive to the group borrow enable signals and borrow signals generated when the negative absolute value of a binary number is half-added to zero in an adder employing subtractive logic for generating the scale factor of the binary number.

Still another object of the present invention is to provide first means responsive to the group borrow enable signals of a borrow pyramid for generating a signal indicating the group receiving the most significant digit of a binary number, second means responsive to said first means for enabling the borrow circuits of said group, and third means responsive to said first means and said enabled borrow circuits for generating an indication of the scale factor of the binary number.

Other objects of the invention and its mode of operation will become apparent upon consideration of the following description and the accompanying drawings in which.

Figures 2, 7:
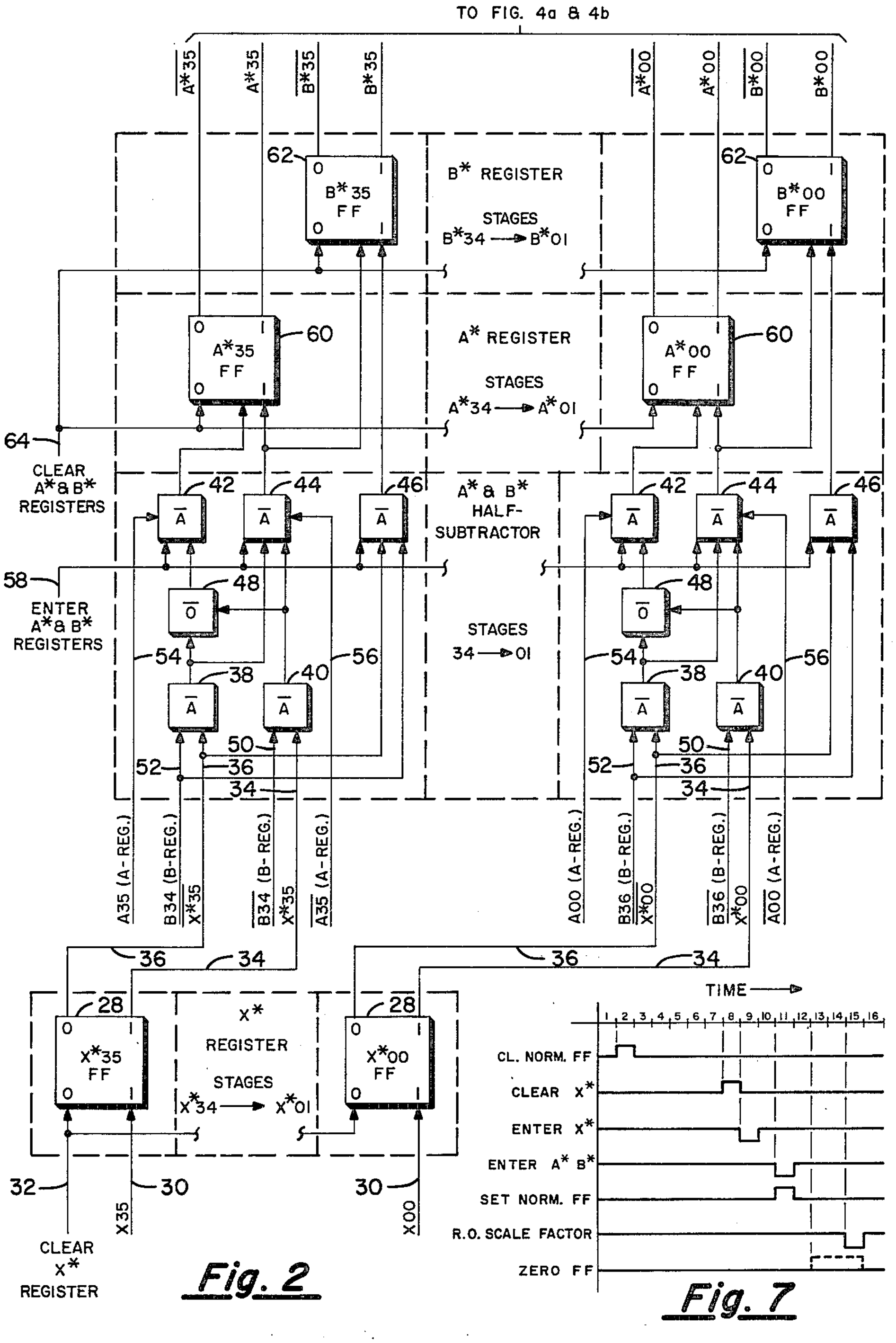
FIGURE 2 shows the X*, A* and B* registers and the A*B* half-subtractor.
Figure 3A:
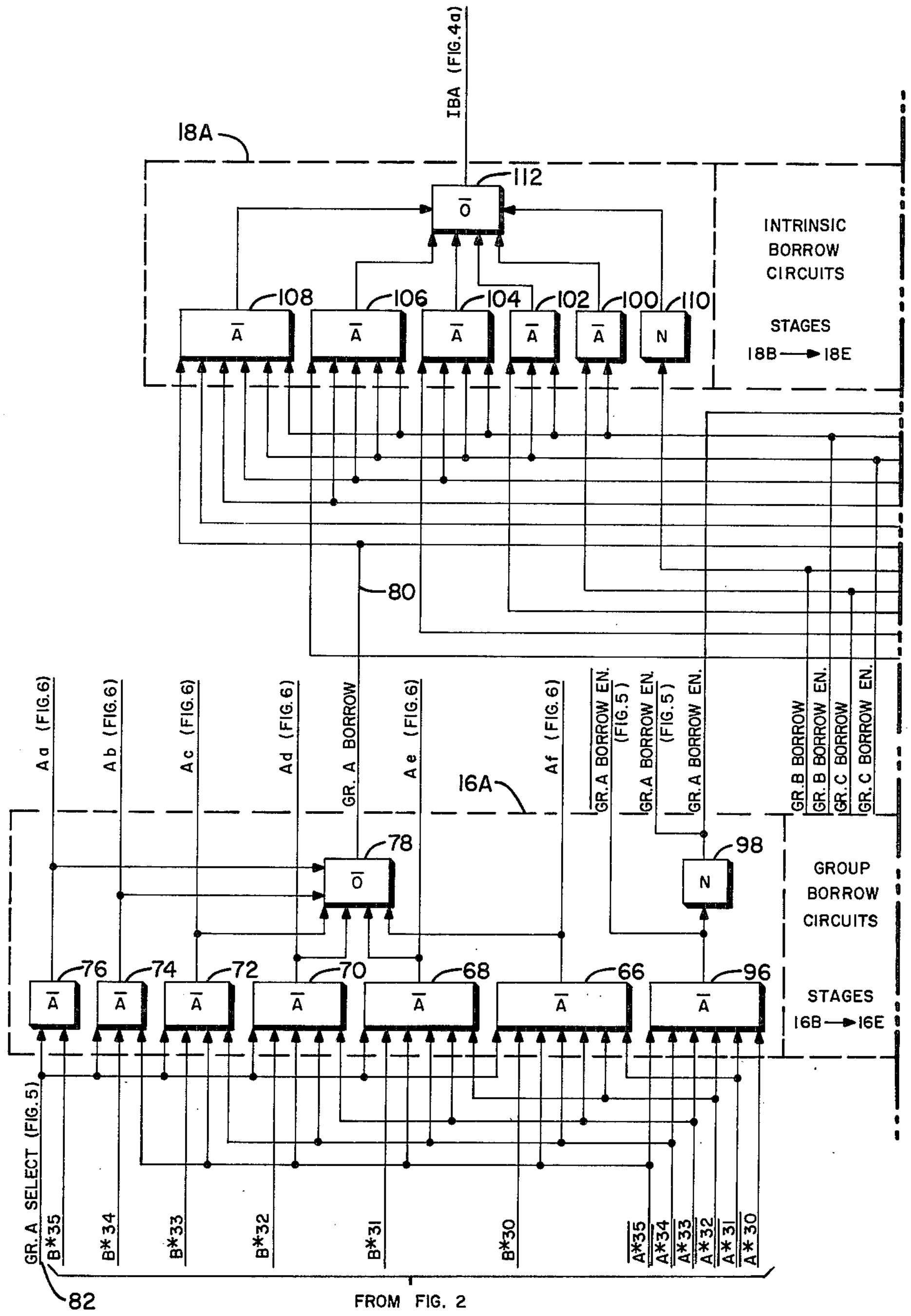
Figure 3B:
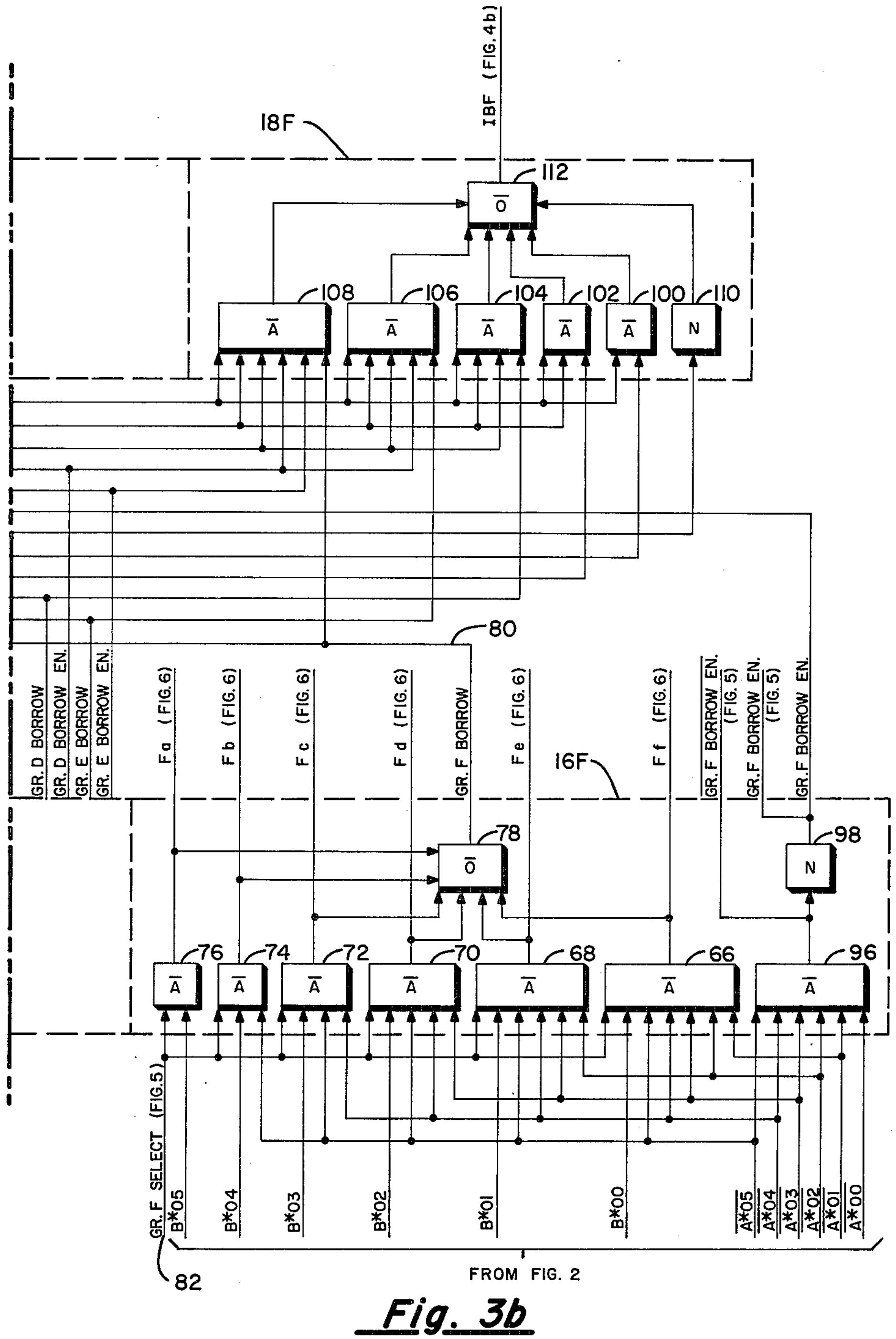
Figure 4A:
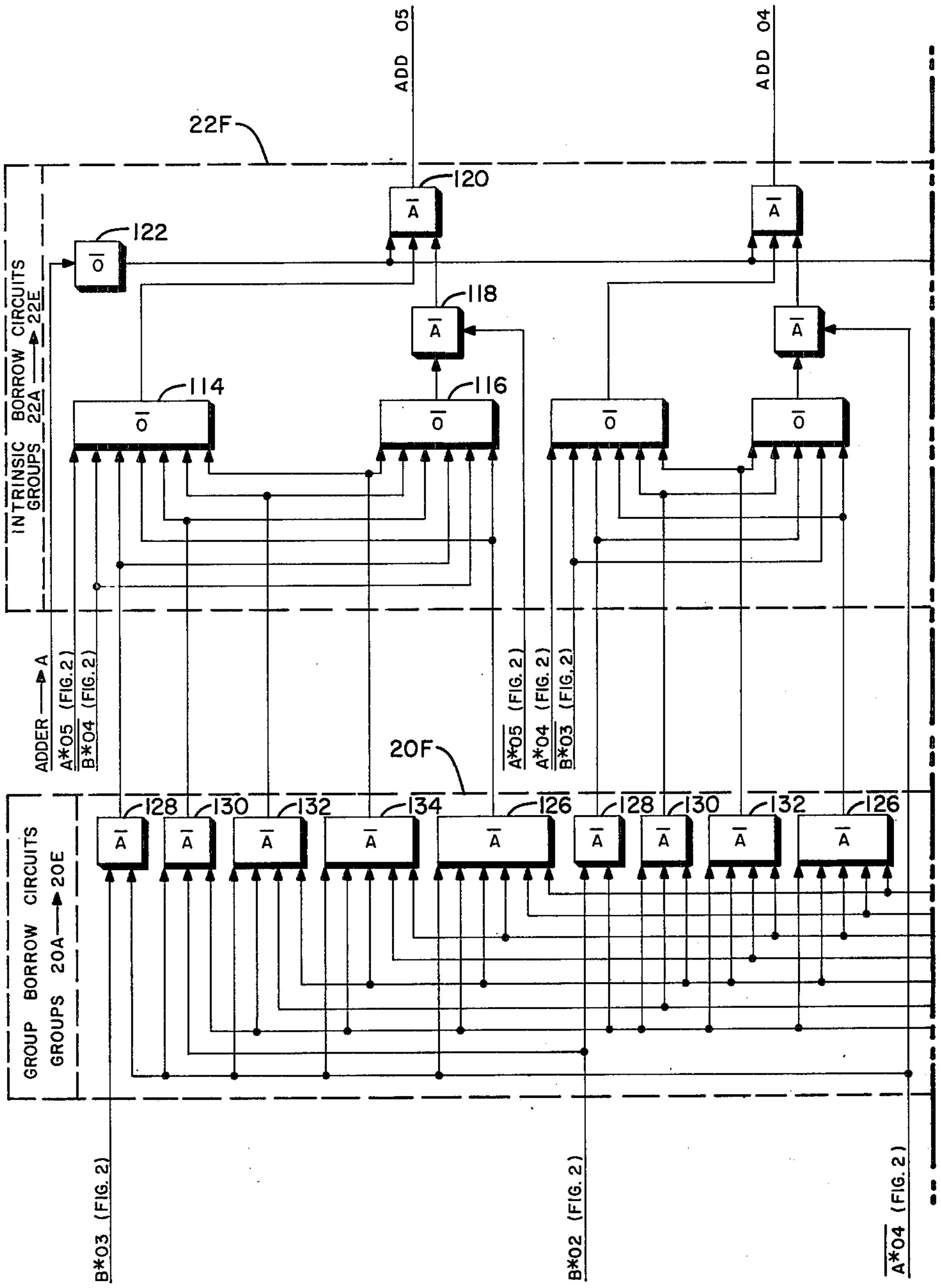
Figure 4B:
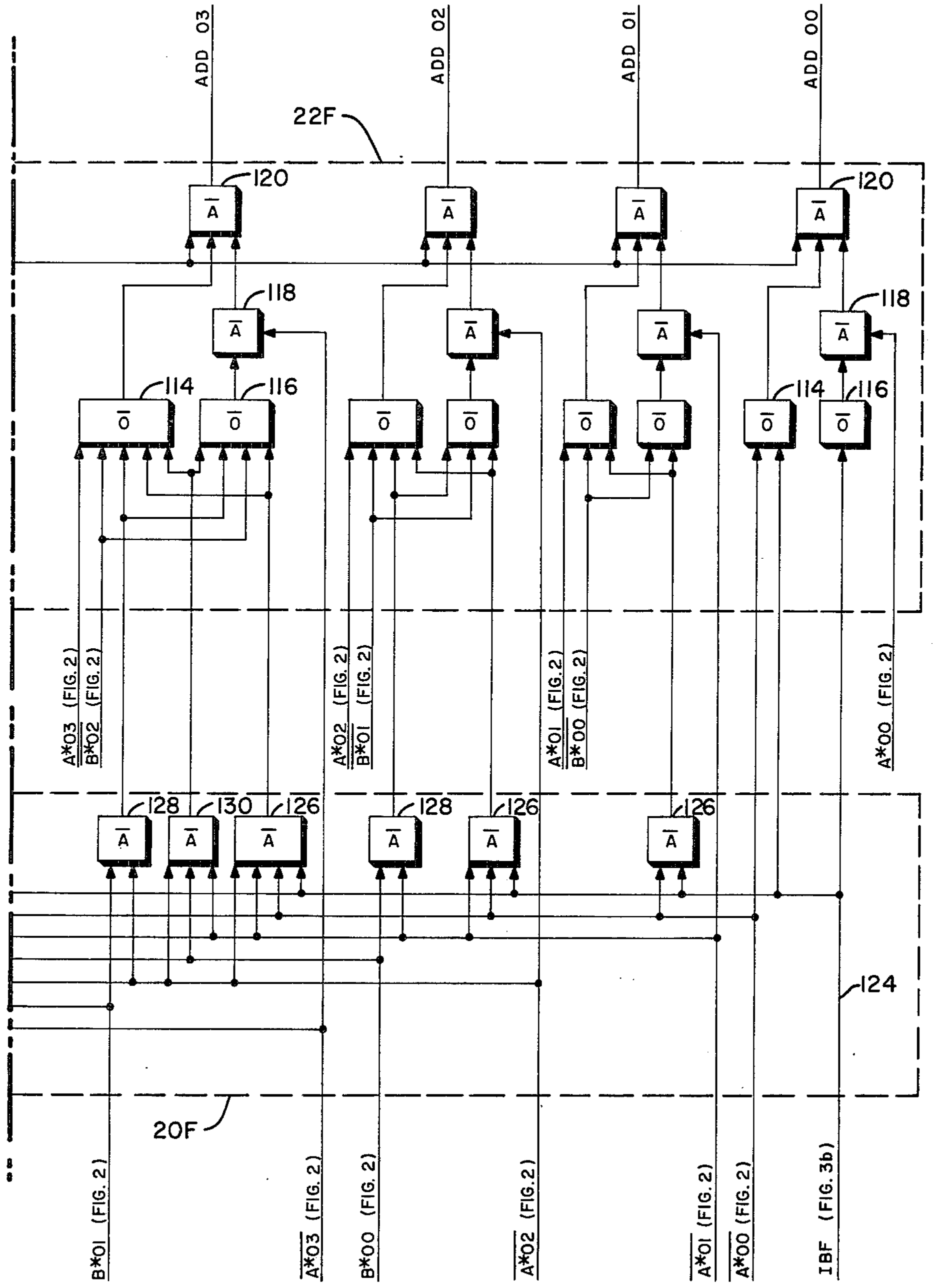
Figure 5:
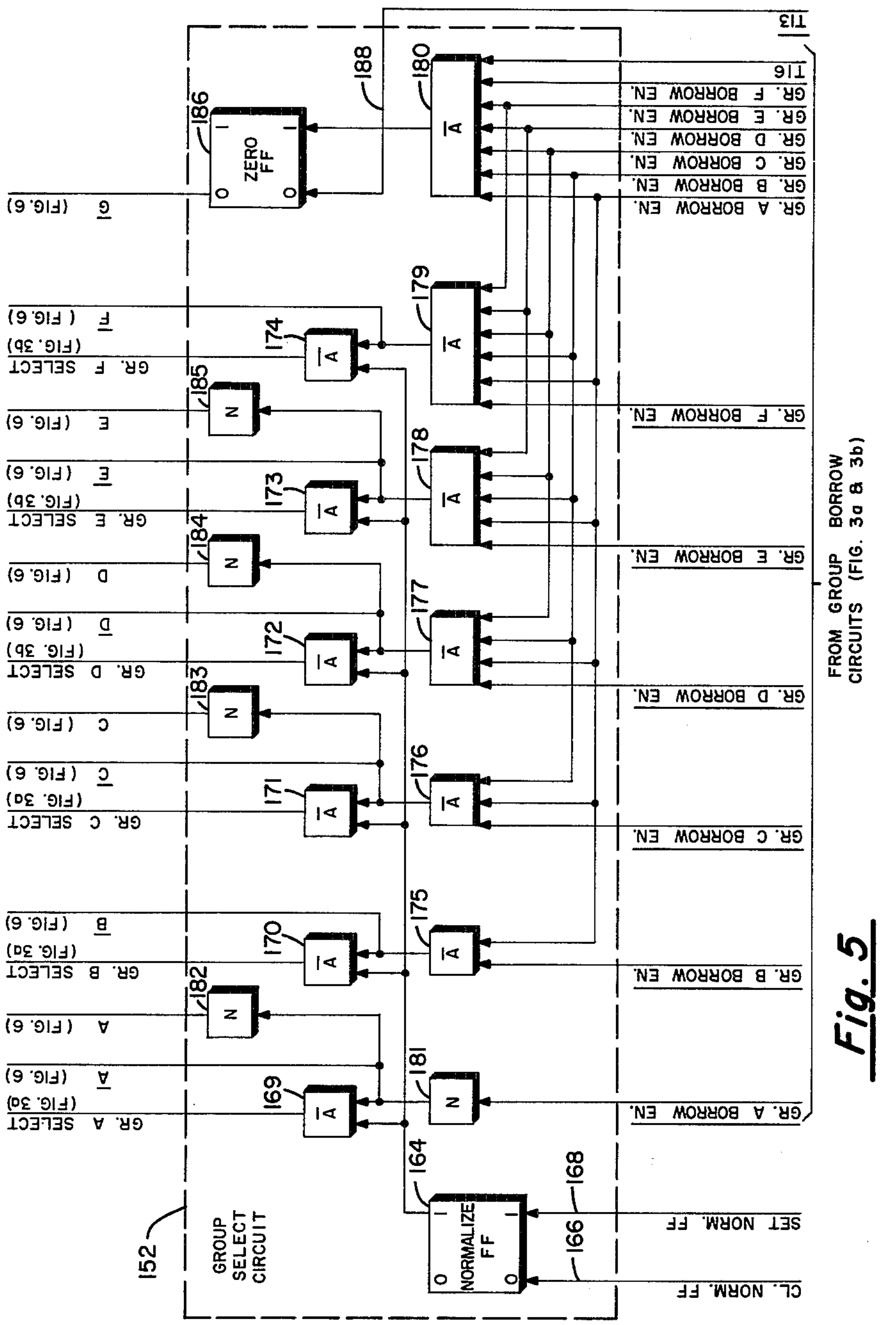
Figure 6:
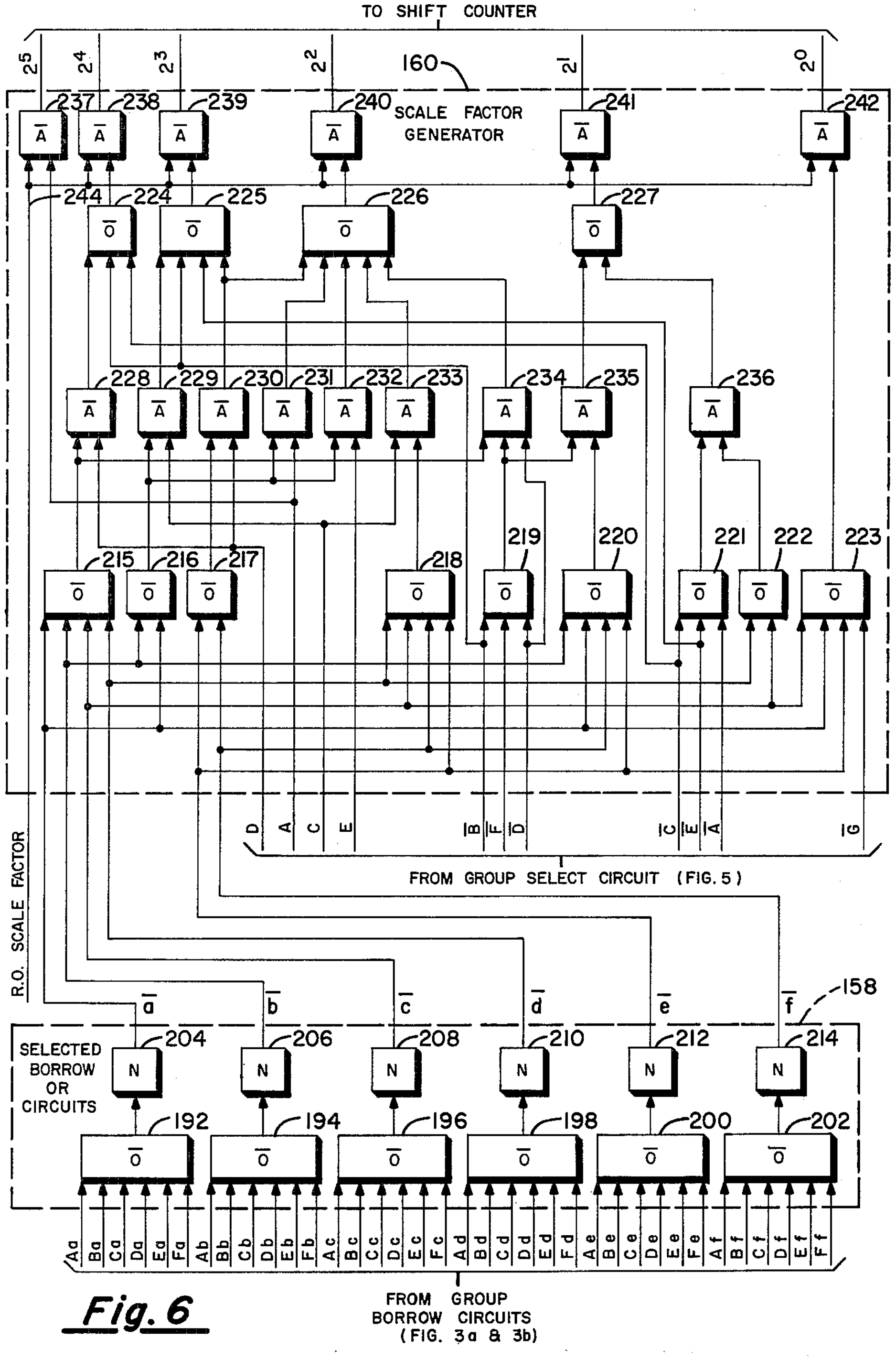

FIGURES 3*a* and 3*b* show the group borrow and intrinsic borrow circuits for the highest and lowest order groups;

FIGURES 4*a* and 4*b* show the final borrow propagation circuits and the main half-subtractor;

FIGURE 5 shows the group select circuits;

FIGURE 6 shows the interstage borrow OR circuits and the shift count generator; and FIGURE 7 is a timing chart showing the sequence of operations for producing a scale factor.

ACCUMULATOR CIRCUITS

Figure 1:
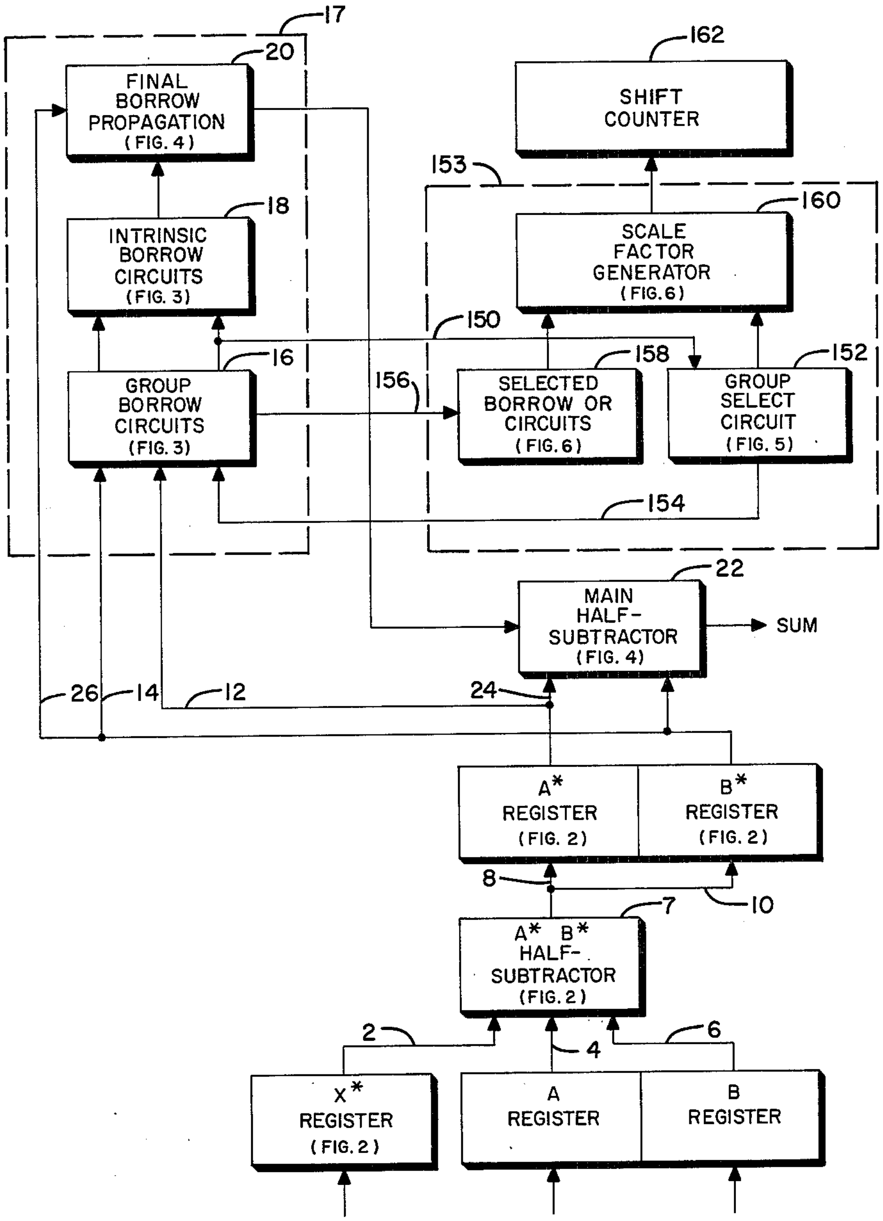
FIGURE 1 is a block diagram showing the present invention in combination with a subtractive accumulator of the prior art.

Referring now to FIGURE 1 a typical prior art device for adding two operands comprises a first half-subtractor A*B*, a first operand storage register X*, a difference digit storage register A, and a borrow digit storage register B. The difference and borrow digits in A and B represent the second operand. It should be understood that the terms half-subtractor, difference and borrow as used herein actually refer to half-adder, sum and carry, respectively. The subtractor terminology is employed because the half-adders shown herein employ subtractive logic. That is, the half-adders perform a half-add operation by subtracting the complement of one input from the other input.

The outputs of each stage of the X* and A registers are applied by way of transfer busses 2 and 4 to corresponding stage of the A*B* half-subtractor. The output of each stage of the B register is effectively left shifted one binary stage by bus 6 which connects each stage of the B register to the next higher order stage of the half-subtractor.

The A*B* half-subtractor half-subtracts the complement of X* from A and then half-subtracts the value in B from the difference. A command Enter A*B* is applied to the half-subtractor to cause the result to be gated into a difference digit storage register A* over bus 8 and a borrow digit storage register B* over bus 10.

The contents of A* and B* are continuously applied by way of transfer busses 12 and 14 to the group borrow circuits 16 of a borrow pyramid 17 which further includes intrinsic group borrow circuits 18 and final borrow propagation circuits 20. The borrow pyramid propagates each interstage borrow from B* to the left and end around in search of a binary one in A*. For each stage that the borrow is propagated a binary one output is produced by the final propagation circuits of the borrow pyramid.

The output of the final borrow propagation circuit is applied to a main half-subtractor 22 where the borrow digits and the propagated borrows are half-subtracted from the difference digits applied to the half-subtractor over bus 24. The manner in which the addition and carry propagation are performed is more fully explained with reference to FIGURES 2–4.

The X*, A* and B* registers and the A*B* half-subtractor are all shown in FIGURE 2.

The X* register comprises thirty-six binary stages for storing a 36-bit binary number and its sign. Only the low order stage X*00 and the sign stage X*35 are shown in FIGURE 2 with intermediate stages X*01 through X*34 being identical to the stages shown. Each stage of the register comprises a flip-flop 28 which may be set in response to a positive data signal on lead 30 or reset in response to a positive command Clear X* appearing on lead 32. When a given flip-flop is set a negative signal appears on the corresponding output lead 34 and a positive signal appears on output lead 36. If the flip-flop is reset then a negative signal appears on the output lead 36 and a positive signal appears on the output lead 34. Signals representing the value stored in the X* register are continuously applied to the A*B* half-subtractor over the leads 34 and 36.

The half-subtractor is actually a three-input adder and performs a half-add operation but because the logic is subtractive it is referred to herein as a half-subtractor.

Each stage of the half-subtractor includes five $\overline{A}$ gates 38, 40, 42, 44 and 46 and an $\overline{O}$ circuit 48. The designation $\overline{A}$ refers to a negative AND gate which produces a positive output signal only when all inputs are negative while the designation $\overline{O}$ refers to an inverting OR circuit which produces a negative output signal if any one of several inputs is positive. The set output terminal of each stage of the X* register is connected to an input of $\overline{A}$40 in the corresponding stage of the half-subtractor. The reset output terminal of each stage of the B register is connected to $\overline{A}$40 in the next higher order stage of the half-subtractor by means of lead 50. The reset output terminal of each stage of the X* register is connected by way of lead 36 to one input of $\overline{A}$38 and $\overline{A}$46 in the corresponding stage of the half-subtractor. The set output terminal of each stage of the B register is connected by way of lead 52 to $\overline{A}$38 and $\overline{A}$46 of the next higher order stage of the half-subtractor. The set and reset output terminals of each stage of the A register are connected by way of the leads 54 and 56 to $\overline{A}$42 and $\overline{A}$44, respectively, in the corresponding stage of the half-subtractor. The output terminals of $\overline{A}$38 and $\overline{A}$40 are both connected to $\overline{A}$44 and $\overline{O}$48. The output of $\overline{O}$48 is applied to $\overline{A}$42.

Each stage of the half-subtractor continuously receives inputs from the A, B and X* registers and applies signals to the gates 42, 44 and 46 representing the result obtained by half-subtracting the complement of X* from A and then half-subtracting B from this result. When the command Enter A*B* appears on lead 58 it conditions the gates 42, 44 and 46 to gate the result of the half-subtract operation to the A* and B* registers.

The A* register comprises thirty-six flip-flops 60 for storing the thirty-six difference digits resulting from the half-subtract operation. Each flip-flop of the A* register may be set in response to a positive output signal from $\overline{A}$42 or $\overline{A}$44 in the corresponding stage of the half-subtractor.

The B* register comprises thirty-six flip-flops 62 for storing the borrow digits resulting from a half-subtract operation. Each stage of the B* register is set in response to a positive output from $\overline{A}$44 or $\overline{A}$46 in the corresponding stage of the half-subtractor. All flip-flops in both the A* and B* registers are reset in response to the command Clear A*B* appearing on lead 64.

Table I is a truth table for predicting the output of the half-subtractor when the B register contains zero. Table II is a corresponding truth table for predicting the output of the half-subtractor when the B register contains one.

*Table I*

B=0

| A | X* | A* | B* |
|---|---|---|---|
| 0 | 0 | 1 | 1 |
| 0 | 1 | 0 | 0 |
| 1 | 0 | 0 | 0 |
| 1 | 1 | 1 | 0 |

*Table II*

B=1

| A | X* | A* | B* |
|---|---|---|---|
| 0 | 0 | 0 | 1 |
| 0 | 1 | 1 | 1 |
| 1 | 0 | 1 | 1 |
| 1 | 1 | 0 | 0 |

Considering first the case where A, B and X* are all zero. Since $A=0$ lead 56 is negative and conditions one input of $\overline{A}$44. Since $X^*=0$ lead 34 is positive thus causing $\overline{A}$40 to produce a negative output signal. Since $B=0$ lead 52 is positive thus causing $\overline{A}$38 to produce a negative output signal to condition the third input of $\overline{A}$44. When the command Enter A*B* appears on lead 58 all inputs to $\overline{A}$44 are negative and it produces a positive output signal to set the flip-flops in the corresponding stage of A* and B*.

As a second example assume that A, B and X* all contain binary ones. Under these conditions lead 56 is positive and blocks $\overline{A}$44. Lead 36 is positive and blocks $\overline{A}$46. Since lead 36 is positive it blocks $\overline{A}$38 thus causing a negative signal to be applied to one input of $\overline{O}$48. Since $B=1$ the lead 50 is positive thus blocking $\overline{A}$40 and causing a negative signal to be applied to the second input of $\overline{O}$48. With all inputs negative $\overline{O}$48 produces a positive output signal to block $\overline{A}$42. When the command Enter A*B* appears on lead 58 gates 42, 44 and 46 remain blocked and no output signals are applied to A* and B*. Since A* and B* are cleared immediately before the command Enter A*B* appear, both A* and B* contain zeros. Operation of the half-subtractor under the remaining conditions listed in Tables I and II should be obvious from the above description. During normal addition operations one operand is contained in X*, the other operand is contained in A, and B is cleared. Thus, for normal addition operations the conditions in Table II never occur.

Consider the numerical example where 35 is added to 38. According to Table I the result of the first half-subtract operation is as follows:

| $2^{35}$ | $2^{29}$ | $2^{23}$ | $2^{17}$ | $2^{11}$ | $2^{5}$ | $2^{0}$ | |
|---|---|---|---|---|---|---|---|
| 000000 | 000000 | 000000 | 000000 | 000000 | 10011 | 0 | A=38 |
| 000000 | 000000 | 000000 | 000000 | 000000 | 00000 | 0 | B=0 |
| 000000 | 000000 | 000000 | 000000 | 000000 | 10001 | 1 | X*=35 |
| 111111 | 111111 | 111111 | 111111 | 111111 | 11101 | 0 | A* |
| 111111 | 111111 | 111111 | 111111 | 111111 | 01100 | 0 | B* |

Each borrow contained in the B* register must be propagated to the left and end around if necessary until it finds a one in the A* register. For each stage through which a borrow is propagated a binary one appears at the output of the borrow pyramid. The propagation of borrows is carried out by the group borrow and intrinsic borrow circuits of FIGURE 3 and the final borrow propagation circuits shown in the lower portion of FIGURE 4.

In order to speed up the borrow propagation operation the 36-bit number in A* is divided into six groups of six bits each. The group containing the sign and the five highest order binary bits is designated Group A while the group containing the six low order bits is designated Group F. Each group is provided with a group borrow circuit 16. Group borrow circuits 16A and 16F are shown in FIGURE 3 with the group borrow circuits for groups B, C, D and E being similar to those shown.

Considering group borrow circuit 16F as an example, each broup borrow circuit includes six gates designated $\overline{A}$66, $\overline{A}$68, $\overline{A}$70, $\overline{A}$72, $\overline{A}$74 and $\overline{A}$76. The output of each of these gates is applied to $\overline{O}$78 which produces a negative output signal on lead 80 if there is a borrow within group F which cannot be absorbed within the group.

The lead 82 is always negative during an add operation and may be ignored in the present description. The leads 84, 86, 88, 90, 92 and 94 are connected to the reset output terminals of stages A*05 through A*00, respectively. Thus, these leads are negative if the corresponding stage of the A* register contains a binary zero. Lead 84 is connected to one input of gates 66, 68, 70, 72 and 74. Lead 86 is connected to one input of gates 66, 68, 70 and 72. Lead 88 is connected to one input of gates 66, 68 and 70. Lead 90 is connected to one input of gates 66 and 68. Lead 92 is connected to one input of gate 66. The set output terminals of B*00 through B*05 are connected to the gates 66, 68, 70, 72, 74 and 76, respectively.

There are several conditions under which a borrow generated within Group F cannot be absorbed within that group. Consider first the case where the borrow occurs in the highest order of the group. Since there are no higher orders in the group this borrow must be propagated to the succeeding groups. A borrow in the highest order of group F is manifested by a negative signal B*05. This conditions $\overline{A}$76 which produces a positive output signal that is inverted at $\overline{O}$78 to become the negative signal Group F Borrow.

If there is a borrow in B*04 and A*05 contains a zero a Group F Borrow must be produced. With all inputs negative $\overline{A}$74 produces a positive output signal which is inverted at $\overline{O}$78 to become the Group F Borrow. $\overline{A}$72 causes the generation of a Group F Borrow signal if there is a borrow in B*03 and both A*04 and A*05 contain zeros. $\overline{A}$70 causes a Group F Borrow signal to be generated when there is a borrow in B*02 and A*03 through A*05 all contain zeros. A Group F Borrow is also generated in response to a positive output signal from $\overline{A}$68 when there is a borrow in B*01 and A*02 through A*05 all contain binary zeros. The output of $\overline{A}$66 causes a Group F Borrow signal to be generated when there is a borrow in the low order stage B*00 and there are zeros in stages A*01 through A*05.

Returning to the numerical example given above where

| $2^{34}$ | $2^{29}$ | $2^{23}$ | $2^{17}$ | $2^{11}$ | $2^{5}$ $2^{0}$ | |
|---|---|---|---|---|---|---|
| 111111 | 111111 | 111111 | 111111 | 111111 | 111010 | A* |
| 111111 | 111111 | 111111 | 111111 | 111111 | 011000 | B* |

it is seen that Group A produces a borrow signal because there is a borrow in the highest order of the group ($2^{35}$) which cannot be subtracted from a one in a higher order of the group. In like manner, Groups B, C, D and E produce group borrow signals because of the borrows present in the high order stages $2^{29}$, $2^{23}$, $2^{17}$ and $2^{11}$ of each of these groups. As shown subsequently, each of these group borrow signals is applied to the final borrow propagation circuits of the next higher order group with the Group A Borrow signal being applied to the final borrow propagation circuits of Group F.

The reset output terminals of stages A*00 through A*05 are also connected to a further gate $\overline{A}$96. Therefore, if A*00 through A*05 all contain zeros all inputs to $\overline{A}$96 are negative and the gate produces a positive output signal which is inverted at N98 to become the signal Group F Borrow Enable. When A*00 through A*05 all contain binary zeros it is obvious that any borrow applied to this group cannot be satisfied within the group. Thus, the Group F Borrow Enable signal is an indication that any borrow applied to Group F should be applied to the next succeeding group since it cannot be satisfied within Group F.

Each group within the borrow pyramid is also provided with an intrinsic borrow circuit 18. Iintrinsic borrow circuits 18A and 18F are shown in FIGURE 3. The intrinsic borrow circuits for groups B, C, D and E are similar to those shown. The intrinsic borrow circuits speed up the borrow propagation by sensing group borrows and group borrow enables.

Referring now to intrinsic borrow circuit 18F, each circuit includes five gates $\overline{A}$100, $\overline{A}$102, $\overline{A}$104, $\overline{A}$106 and $\overline{A}$108, and an inverter N110. The output from the inverter as well as the outputs from each of the gates is applied to $\overline{O}$112. If the inverter or any of the gates produces a positive output signal it is inverted by $\overline{O}$112 and becomes the intrinsic borrow signal.

In the following description it should be remembered that all group borrow signals and group borrow enable signals move to the left and end around hence Group A is considered to be to the right of Group F, Group F is to the right of Group E, and so forth.

Generally speaking, N110 of a given intrinsic borrow circuit produces a positive output signal when there is a borrow generated by the group borrow circuit on its right. Noting intrinsic borrow circuit 18F in particular, it is seen that the Group A borrow signal is applied to N110.

$\overline{A}$100 of a given intrinsic borrow circuit produces a positive output signal if a group borrow is produced by the second group borrow circuit to its right and the intervening group borrow circuit produces a group borrow enable signal indicating that it cannot absorb the borrow. Reference to intrinsic borrow circuit 18F shows that $\overline{A}$100 receives the Group B Borrow signal and the Group A Borrow Enable signal.

$\overline{A}$102 of a given intrinsic borrow circuit produces a positive output signal if the third group borrow circuit to the right produces a borrow signal and the first and second group borrow circuits to its right produce group borrow enable signals. Referring again to 18F it is seen that $\overline{A}$102 receives Group C Borrow signals as well as Group A and Group B Borrow Enable signals.

$\overline{A}$104 of a given intrinsic borrow circuit produces a positive output signal if the fourth group borrow circuit to its right produces a group borrow signal and the first, second and third group borrow circuits to its right produce group borrow enable signals.

$\overline{A}$106 of a given intrinsic borrow circuit produces a positive output signal if the fifth group borrow circuit to its right produces a group borrow signal and the first, second and third and fourth group borrow circuits to its right produce group borrow enable signals.

Finally, $\overline{A}$108 of a given intrinsic borrow circuit produces a positive output signal if the corresponding group borrow circuit produces a group borrow signal and all other group borrow circuits produce group borrow enables. This is an indication that a group borrow generated by one stage of the group must be propagated to the left and end around to be satisfied by a lower order stage within the same group.

The intrinsic borrow signals produced in FIGURE 3 are applied to the final propagation circuits in the main half-subtractor. The final propagation circuits and the main half-subtractor are also divided into six groups of six stages each corresponding to the six groups of intrinsic borrow circuits. The final borrow propagation circuits and half-subtract circuits for Group F are shown in FIGURE 4. Groups A through E are similar to Group F.

Each stage of the half-subtractor half-subtracts the output of borrow pyramid from A*. For this purpose each stage of the half-subtractor is provided with circuits $\overline{O}$114, $\overline{O}$116 and $\overline{A}$118. The output of $\overline{O}$114 is applied to a read-out gate $\overline{A}$120. The output of $\overline{O}$116 is applied to one input of $\overline{A}$118 which also receives signals from the reset side of the corresponding stage of the A* register. The output of $\overline{A}$118 is applied to the second input of $\overline{A}$120. If a given stage of A* contains a binary zero and a borrow is propagated into that stage the output from the stage should be a binary one. When a borrow is applied to a stage it causes a positive signal to be applied to $\overline{O}$114 and $\overline{O}$116. Thus, if A* contains a zero both inputs to $\overline{A}$118 are negative and it produces a positive output siganl to $\overline{A}$120. When the command Adder to A is inverted at $\overline{O}$122 to apply a negative signal to the readout gates 120 of each stage gate 120 continues to produce a negative output signal if the output of A118 is positive. A negative output signal from a gate 120 during readout time is an indication that the result of the half-subtract operation for that stage is a binary one. In normal addition operations all stages of the A register are set to one and the output from the main half-subtractor gated to A upon the occurrence of the command Adder to A. Since each stage of the main half-subtractor produces a positive signal if the corresponding result digit is zero, the result may be entered into A by resetting each stage of the A register where the corresponding stage of the main half-subtractor produces a positive output signal.

A binary one result is also obtained when a zero borrow is half-subtracted from a one from A*. In this case all inputs to $\overline{O}$114 are negative and it produces a positive output signal to block $\overline{A}$120 during read-out time.

The remaining $\overline{A}$ gates shown in FIGURE 4 constitute the final borrow propagation circuits. Low order stage 00 has no borrow propagation gates. Instead, the Group F intrinsic borrow signal on lead 124 is inverted at $\overline{O}$116 of stage 00 and applied to $\overline{A}$118. If there is no intrinsic borrow and A*00 contains a binary one $\overline{A}$118 produces a positive output signal to block gate 120 of stage 00. If there is an intrinsic borrow and A*00 contains a binary zero both inputs to $\overline{O}$114 of stage 00 are negative and it produces a positive output signal to block gate 120.

The Group F intrinsic borrow appearing on lead 124 is also applied to one input of $\overline{A}$126 in stages 1 through 5. The gates 126 are the intrinsic borrow gates and operate to admit an intrinsic borrow appearing on lead 124 into each stage up to the lowest order stage which receives a binary one signal from A*. The signal $\overline{A*00}$ is applied to gate 126 of stages 01 through 05. The signal $\overline{A*01}$ is applied to gates 126 of stages 02 through 05. The signal $\overline{A*02}$ is applied to gates 126 of stages 03 through 05. The signal $\overline{A*03}$ is applied to gates 126 of stages 04 and 05 while the signal $\overline{A*04}$ is applied to gate 126 of stage 05. Obviously, therefore, an intrinsic borrow signal appearing on lead 124 may enter stage 01 of the adder if A*00 contains a zero, may enter stages 01 and 02 of the adder if A*00 and A*01 both contain zeros, may enter stages 01 through 03 of the adder if A*00 through A*02 contain zeros, may enter stages 01 through 04 of the adder if A*00 through A*03 are all zero, and may enter stages 01 through 05 of the adder if stages A*00 through A*04 all contain binary zeros.

The final borrow propagation circuits also include means for handling the interstage borrows within a group which may be satisfied within the same group. In order to provide a borrow signal from one stage to the next higher order stage the output from the reset side of each stage of B* is applied to the circuits $\overline{\text{O114}}$ and $\overline{\text{O116}}$ in the next higher order subtractor stage. As shown in FIGURE 4 for Group F the reset outputs from B*00 through B*04 are applied to $\overline{\text{O114}}$ and $\overline{\text{O116}}$ of stages 01 through 05, respectively, of the half-subtractor.

The gates $\overline{\text{A128}}$ provide a borrow input to a given stage of the subtractor if the next lower order of A* contains a binary zero and there is a borrow originated two binary orders to the right. Consider, for example, stage 02 of the subtractor which receives an output from $\overline{\text{A128}}$ if A*01 contains a binary zero and there is a borrow stored in B*00.

The gates $\overline{\text{A130}}$ provide a positive output of the corresponding stage of the subtractor if the two binary orders to the right in A* contain zeros and there is a borrow stored in the third binary order to the right. As shown in FIGURE 4, $\overline{\text{A130}}$ provides a positive output signal to stage 03 of the half-adder if A*02 and A*01 contain zeros and there is a borrow stored in B*00.

The gates $\overline{\text{A132}}$ apply a borrow signal to the corresponding stage of the subtractor if there is a borrow originated four binary orders to the right and the intervening stages of A* contain zeros. Noting FIGURE 4, the output of $\overline{\text{A132}}$ applies a borrow signal to stage 04 of the subtractor if there is a borrow stored in B*00 and A*01 through A*03 all contain zeros.

$\overline{\text{A134}}$ provides a borrow input signal to stage 05 of the subtractor if there is a borrow in B*00 which cannot be satisfied in the intervening stages because A*01 through A*04 all contain zeros.

Returning to the numerical example where 35 was added to 38, it was shown that group borrows were generated in Groups A, B, C, D and E, no group generated a group borrow enable signal, and A* and B contained the values indicated below.

| $2^{35}$ | $2^{30}$ | $2^{29}$ | $2^{24}$ | $2^{23}$ | $2^{18}$ | $2^{17}$ | $2^{12}$ | $2^{11}$ | $2^{6}$ | $2^{5}$ | $2^{0}$ | |
|---|---|---|---|---|---|---|---|---|---|---|---|---|
| 11111 | 1 | 11111 | 1 | 11111 | 1 | 11111 | 1 | 11111 | 1 | 11101 | 0 | A* |
| 11111 | 1 | 11111 | 1 | 11111 | 1 | 11111 | 1 | 11111 | 1 | 01100 | 0 | B* |

The manner in which the borrows in B* are propagated to the left and end around will now be shown. Reference to intrinsic borrow circuit 18A shows that the Group B Borrow signal is inverted at N110 and inverted again at $\overline{\text{O112}}$ to become the Group A intrinsic borrow. The intrinsic borrow signal is applied to gates $\overline{\text{A172}}$ stages 31 through 35 of the half-subtractor. Since stage A*30 contains a binary one the intrinsic borrow signal has no effect on these stages. However, the intrinsic borrow is applied to stage 30 of the subtractor.

The borrows in stages B*30 through B*34 cause positive signals to be applied to $\overline{\text{O114}}$ and $\overline{\text{O116}}$ in stages 31 through 35 of the subtractor. Thus, the borrow output of Group A of the borrow pyramid is 111111 where the rightmost one represents the intrinsic borrow.

In like manner, the Group C Borrow signal is applied to the Group B intrinsic borrow circuit 18B (not shown) to produce the Group B intrinsic borrow signal. Since A*24 contains a binary one the Group B intrinsic borrow has no effect on stages 25 through 29 but enters stage 24. The borrows in stages B*24 through B*28 cause positive signals to be applied to $\overline{\text{O114}}$ and $\overline{\text{O116}}$ in stages 25 through 29 of the subtractor. Thus, the borrow output of Group B of the borrow pyramid is 111111.

From the above description it becomes obvious that the Group D and E borrow signals produce Group C and D intrinsic borrows which are applied to stages 12 and 18 of the subtractor. The borrows in B*12 through 16 and B*18 through 22 are applied to stages B*13 through 17 and B*19 through 23. Thus, the borrow outputs from Groups C and D of the borrow pyramid are 111111 and 111111.

Group F produced no group borrow signal and none of the other conditions for generating a Group E intrinsic borrow exist. Therefore, no borrow is applied to the lowest order stage 6 of Group E. Since B* contains borrows in stages 6 through 10 these borrows are applied to subtractor stages 7 through 11 and the resulting borrow signal output of Group E of the borrow pyramid is 111110.

Group A produced a borrow signal which is applied to the Group F intrinsic borrow circuit 18F of FIGURE 3. This circuit produces a Group F intrinsic borrow signal which is applied over lead 124 to stage 00 and also applied to the gates $\overline{\text{A126}}$ in stages 01 through 05. Since A*00 contains a zero the intrinsic borrow passes through $\overline{\text{A126}}$ of stage 01. The presence of a one in A*01 prevents the intrinsic borrow from entering stages 02 through 05. The borrows in B*03 and B*04 are applied to stages 04 and 05 of the subtractor. Therefore, the borrow output from Group F of the borrow pyramid is 110011 where the two rightmost ones are the result of the intrinsic borrow.

The combined borrow output from the borrow pyramid as shown above is 111111 111111 111111 111111 111110 110011. The final step in adding two numbers is to half-subtract the output of the borrow pyramid from the value in A*. This is accomplished by the main half-subtractor in the manner described above.

| | $2^{30}$ | | $2^{24}$ | | $2^{18}$ | | $2^{12}$ | | $2^{6}$ | | $2^{0}$ | |
|---|---|---|---|---|---|---|---|---|---|---|---|---|
| 11111 | 1 | 11111 | 1 | 11111 | 1 | 11111 | 1 | 11111 | 1 | 11101 | 0 | A* |
| 11111 | 1 | 11111 | 1 | 11111 | 1 | 11111 | 1 | 11111 | 0 | 11001 | 1 | Borrow Pyramid |
| 00000 | 0 | 00000 | 0 | 00000 | 0 | 00000 | 0 | 00000 | 1 | 00100 | 1 | Sum |

The result is $2^6+2^3+2^0=64+8+1=73$ which is in fact the sum of 35 and 38.

SCALE FACTOR CIRCUITS

The present invention is based on the fact that when the negative absolute value in a binary number is added to zero in an adder of the type heretofore described the highest order initiating a group borrow is the highest order containing a significant digit. Therefore, by performing a half-add operation and sensing the highest order initiating a group borrow a signal is obtained which may be translated to obtain the scale factor of the number.

As an example consider the binary number

| $2^{35}$ | $2^{29}$ | $2^{23}$ | $2^{17}$ | $2^{11}$ | $2^{5}$ |
|---|---|---|---|---|---|
| 000000 | 000000 | 000000 | 000000 | 000000 | 010010 |

The scale factor of this number is 30 since it would require a shift of 30 places to the left in order to shift the binary one in stage 4 to stage 34. The negative absolute value of a positive number is the complement of the number. The negative absolute value of a negative number is the negative number without change.

Referring now to FIGURE 1, the scale factor operation requires that the A and B registers be cleared and the negative absolute value of the binary number entered into X*. The A*B* half-subtractor then half-subtracts the complement of X* from A and half-subtracts B from the result. The different digits are entered in A* and the borrow digits in B* according to the conditions stated in Table I above.

| | | | | | | |
|---|---|---|---|---|---|---|
| 000000 | 000000 | 000000 | 000000 | 000000 | 000000 | A |
| 000000 | 000000 | 000000 | 000000 | 000000 | 000000 | B |
| 111111 | 111111 | 111111 | 111111 | 111111 | 101101 | X* |
| 000000 | 000000 | 000000 | 000000 | 000000 | 010010 | A* |
| 000000 | 000000 | 000000 | 000000 | 000000 | 010010 | B* |

The contents of A* and B* are continuously applied to the group borrow circuits 16 in the same manner as when an add operation is performed.

Since stages A*30 through A*35 contain binary zeros the Group A borrow circuits (FIGURE 3) produce a Group A Borrow Enable signal. In like manner groups B, C, D and E produce group borrow enable signals since, for the example chosen, stages 6 through 29 of A* are all zero. Group F does not produce a group borrow enable signal because A*01 and A*04 contain ones thus the signal $\overline{\text{Group F Borrow Enable}}$ is negative.

The group borrow enable signals and their complements are applied by way of bus 150 to the group select circuit 152 in the scale factor device 153. The purpose of the group select circuit is to determine the highest order group borrow circuit which does not produce a group borrow enable signal. From the above description it is obvious that this group is the one which contains the most significant digit. Upon making the determination of which group does not produce a group borrow enable signal the group select circuit applies a signal over bus 154 to condition the borrow gates of one of the group borrow circuits.

FIGURE 5 shows the details of the group select circuit 152. The group select circuit includes a plurality of read-out gates 169 through 174 responsive to the outputs from an inverter N181 and a plurality of gates 175 through 179. N181 and gates 175 through 179 determine the highest order group borrow circuit which does not produce the group borrow enable and blocks the group select gate corresponding to this group.

Each of the group select gates has one input connected to the set side of the Normalizer flip-flop 164. This flip-flop remains in the reset condition during normal addition operations but during the scale factor operation it is cleared at time T2 (see FIGURE 7) by a positive signal on lead 166 and is set at time T11 by a positive signal on lead 168. The negative signal off the set output terminal conditions one input of each of the group select gates when the flip-flop is set.

The outputs from each of the group select gates is applied to the group borrow gates shown in FIGURE 3. The output of $\overline{A}$169 is the signal Group A Select and this signal is applied to each of the group borrow gates 66, 68, 70, 72, 74 and 76 in the group borrow circuits for Group A. The output of $\overline{A}$174 is the signal Group F Select and this signal is applied to the group borrow gates 66, 68, 70, 72, 74 and 76 of the Group F borrow circuits. The outputs from gates $\overline{A}$170 through $\overline{A}$173 are applied to the group borrow circuits for groups B, C, D and E, respectively, although these borrow circuits are not shown in FIGURE 3.

It should be noted that if both inputs to a group select gate are negative the gate produces a positive output signal which blocks the borrow gates in the borrow circuits of the corresponding group.

The signal $\overline{\text{Group A Borrow Enable}}$ is inverted at N181 and applied to one input of Group A select gate 169 and inverted N182. If the signal $\overline{\text{Group A Borrow Enable}}$ is negative thus indicating a binary one in at least one stage of Group A the output of N181 blocks gate 169 and the select gate produces a negative output signal to condition the Group A borrow circuits. The positive output from N181 is inverted at N182 to become signal A which indicates that Group A contains the most significant digit of the binary number. This signal is applied to the scale factor generator shown in FIGURE 6. $\overline{A}$175 determines whether or not Group B contains the most significant digit of the binary number. Therefore, this gate receives the signals Group A Borrow Enable and $\overline{\text{Group B Borrow Enable}}$. The Group A Borrow Enable signal indicates that all stages of Group A contain binary zeros and the $\overline{\text{Group B Borrow Enable}}$ signal indicates that at least one stage of Group B contains a binary one. When both signals are negative $\overline{A}$175 produces a positive output signal to block Group B select gate 170 and thus enable the Group B borrow gates.

The Group A Borrow Enable signal is applied to one input of gates 175 through 179. The Group B Borrow Enable signal is applied to one input of gates 176 through 179. The group C Borrow Enable signal is applied to one input of gates 177 through 179. The Group D Borrow Enable signal is applied to one input of gates 178 and 179, and the group E Borrow Enable signal is applied to gate 179 only. The $\overline{\text{Group Borrow Enable}}$ signals B through F are applied to the gates 175 through 179, respectively. In addition to being connected to the group select gates the gates 175 through 179 provide output signals to the scale factor generator of FIGURE 6. Inverters 183, 184 and 185 are connected to the outputs of gates 176, 177 and 178 in order to invert the output signals from these gates before they are applied to the scale factor generator.

The operation of the group select circuit may be better understood from the following example. Assume that a scale factor operation is being performed on a number in which the most significant digit appears in the binary order $2^6$. This is the lowest order stage associated with Group E. Since all stages for Groups A, B, C and D contain binary zeros the group borrow circuits for each of these groups each produces a group borrow enable signal. Since Group E contains at least one binary one the signal $\overline{\text{Group E Borrow Enable}}$ is negative. Therefore, all inputs to $\overline{A}$178 are negative and it produces a positive output signal to block the Group E select gate 173 and thus condition the Group E borrow circuits. The output of $\overline{A}$178 is also inverted at N185 and this signal and its complement are applied to the scale factor generator.

A gate $\overline{A}$180 and Zero Flip-Flop 186 are provided for detecting that the number upon which the scale factor operation is being performed is zero. Note that if the binary number is zero the $\overline{\text{Group Borrow Enable}}$ signals for Groups A through F are all positive and none of the group borrow circuits is selected because all of the group select gates are conditioned. However, because of certain design considerations it is necessary to provide the scale factor generator with an indication that the number is equal to zero. The Zero Flip-Flop is normally reset at time T13 by a positive clock pulse on lead 188. If the number upon which the scale factor operation is being performed is not zero then the Zero Flip-Flop remains reset during the remainder of the scale factor operation. $\overline{A}$180 receives the group borrow enable signal from Groups A through F, as well as a timing pulse which occurs at time T16 on lead 190. If the number upon which the scale factor operation being performed is zero then Groups A through F all produce group borrow signals and at time T16 $\overline{A}$180 produces a positive output signal to set the Zero Flip-Flop. The resulting positive signal at the reset output terminal of the flip-flop is designated $\overline{G}$ and is applied to the scale factor generator of FIGURE 6.

The signals $\overline{A}$ through $\overline{G}$ as well as their complements are applied to the scale factor generator to indicate the highest order group that contains a significant digit. However, before the scale factor generator can generate the scale factor a determination must be made of the highest order stage within the selected group which generates a borrow. Therefore, the output from the group select gates of FIGURE 5 condition the group borrow gates in a selected one of the group borrow circuits 16 when the Normalizer Flip-Flop is set. As shown in the preceding example the binary number upon which the scale factor operation is being performed is contained in both A* and B* after the half-subtract operation is performed by the A*B* half-subtractor. As explained with reference to the group borrow circuits of FIGURE 3 these group borrow circuits produce a group borrow signal from that stage in which B* contains a borrow if no higher orders of A* contain a binary one. Since A* and B* contain the same values it appears obvious that the selected group borrow circuits produce a group borrow signal from the highest order stage of the group where B* contains a borrow. In FIGURE 3 these signals are taken from the outputs of the gates 66, 68, 70, 72, 74 and 76 and are designated by a capital letter and a small letter. The capital letter designates the group from which the signal originates and the small letter designates the stage within the group. Thus, A*a* designates the highest order stage of Group A and corresponds to stage 35 while F*f* designates the low order stage of Group F and corresponds to stage 00.

The leads A*a* through F*f* are applied to the selected borrow OR circuits shown in FIGURE 6. More particularly, the borrow output from the high order stage of each group is applied to a first OR circuit 192, the borrow output from the next to the high order stage of each group is applied to a second OR circuit 194 and so on with the low order stage of each group being connected to an OR circuit 202. The outputs of $\bar{O}$192, 194, 196, 198, 200 and 202 are inverted at N204, 206, 208, 210, 212 and 214, respectively, to become the signals $\bar{a}$, $\bar{b}$, $\bar{c}$, $\bar{d}$, $\bar{e}$ and $\bar{f}$. Since the group select circuits of FIGURE 5 select or enable the borrow gates of only one group of the group borrow circuits and only one stage of this group can produce an output signal on one of the leads A*a* through F*f* is apparent that only one of the leads $\bar{a}$, $\bar{b}$, $\bar{c}$, $\bar{d}$, $\bar{c}$, $\bar{f}$ can be positive when the Normalizer Flip-Flop is set. The particular lead which is positive at this time indicates the highest order stage within the selected group which contains a significant digit.

The scale factor generator 160 shown in FIGURE 6 receives the signals $\bar{A}$ through $\bar{G}$ representing the highest order group containing a significant digit and the signals $\bar{a}$ through $\bar{f}$ representing the highest order stage containing a significant digit within the group containing the highest order significant digit and generates an indication of the scale factor of the binary number.

The scale factor generator includes a plurality of $\bar{O}$ circuits 215 through 227 and a plurality of gates $\bar{A}$228 through $\bar{A}$242. The lead $\bar{a}$ is connected to $\bar{O}$215, $\bar{O}$216, $\bar{O}$220 and $\bar{O}$223. The lead $\bar{b}$ is connected to $\bar{O}$215, $\bar{O}$216 and $\bar{O}$220. The lead $\bar{c}$ is connected to $\bar{O}$215, $\bar{O}$218, $\bar{O}$222 and $\bar{O}$223. The lead $\bar{d}$ is connected to $\bar{O}$215, $\bar{O}$218 and $\bar{O}$222. The lead $\bar{e}$ is connected to $\bar{O}$217, $\bar{O}$218, $\bar{O}$220 and $\bar{O}$223. The lead $\bar{f}$ is connected to $\bar{O}$217, $\bar{O}$218 and $\bar{O}$220. The lead $\bar{A}$ is connected to $\bar{O}$221. The lead $\bar{B}$ is connected to $\bar{O}$219, $\bar{O}$224 and $\bar{O}$225. The lead $\bar{C}$ is connected to $\bar{O}$221, $\bar{O}$224 and $\bar{O}$225. The lead $\bar{D}$ is connected to $\bar{O}$219 and $\bar{A}$234. The lead $\bar{E}$ is connected to $\bar{O}$221 and $\bar{O}$225. The lead $\bar{F}$ is connected to $\bar{O}$219. Lead A is connected to $\bar{A}$231 to $\bar{A}$237. The lead $\bar{C}$ is connected to $\bar{A}$229 and $\bar{A}$233. The lead D is connected to $\bar{A}$228 and $\bar{A}$230. The lead $\bar{E}$ is connected to $\bar{A}$232.

The output of $\bar{O}$215 is connected to $\bar{A}$228 and $\bar{A}$234. The output of $\bar{O}$216 is connected to $\bar{A}$229, $\bar{A}$231 and $\bar{A}$232. The output of $\bar{O}$217 is connected to $\bar{A}$230, while the output of $\bar{O}$218 is connected to $\bar{A}$233. The output $\bar{O}$219 is connected to $\bar{A}$234 and $\bar{A}$235. The output of $\bar{O}$220 is connected to $\bar{A}$235. The outputs from both $\bar{O}$221 and $\bar{O}$222 are connected to $\bar{A}$236 while the output of $\bar{O}$223 is connected to $\bar{A}$242. The output of $\bar{A}$228 is applied to $\bar{O}$224 while the output of $\bar{A}$229 is applied to $\bar{O}$225. The output of $\bar{A}$230 is applied to both $\bar{O}$225 and $\bar{O}$226. The outputs from $\bar{A}$231 through $\bar{A}$234 are all applied to $\bar{O}$226. The outputs of $\bar{A}$235 and $\bar{A}$236 are applied to $\bar{O}$227. The outputs from $\bar{O}$224 through $\bar{O}$227 are applied to $\bar{A}$238 through $\bar{A}$241, respectively.

Gates 237 through 242 are the readout gates for the scale factor generator. The generator generates a scale factor as long as signals are applied to its inputs but the scale factor may be read out only upon the occurrence of a readout signal on the lead 244. This signals occurs during time T15 of the scale factor operation and conditions one input of each of the gates 237 through 242. The output signal from each of these gates indicates one digit of a 6-digit binary number representing the scale factor. As will be shown subsequently, the number read out from the scale factor generator is actually 36 minus the true scale factor value. This value may then be entered into the shift counter 162 shown in FIGURE 1 to control the left shift or normalizing operation. If the shift counter is a modulo-36 counter and is advanced by a count of one as each shift is performed the counter will reach a full count when the significant digit is shifted into the binary order adjacent the sign stage. Upon reaching a full count the shift counter emits a signal to stop the shift operation. This method of controlling a shift operation is well known in the art.

Alternatively, the output from the scale factor generator may be applied to a large transfer matrix so that the binary number is shifted the desired number of places as it is transferred from one register to another.

In order to illustrate the operation of the borrow and scale factor circuits during a scale factor operation consider again the numerical example given above wherein A* and B* contain the values

| | $2^{35}$ | $2^{29}$ | $2^{23}$ | $2^{17}$ | $2^{11}$ | $2^{5}$ | |
|---|---|---|---|---|---|---|---|
| | 000000 | 000000 | 000000 | 000000 | 000000 | 010010 | A* |
| and | 000000 | 000000 | 000000 | 000000 | 000000 | 010010 | B* |

after the half-subtract has been performed.

The presence of zeros in A*30 through A*35 causes group borrow circuit 16A to produce the Group A Borrow Enable signal. In like manner, the zeros in A*06 through A*29 cause group borrow circuits 16B through 16E to produce group borrow enable signals. The presence of ones in A*01 and A*04 causes group borrow circuit 16F to produce the signal $\overline{\text{Group F Borrow Enable}}$. These signals are applied to the group select circuit of FIGURE 5 where this particular combination of signals conditions all inputs to $\bar{A}$179 and at the same time generates the positive signal $\bar{F}$. The positive output of $\bar{A}$179 blocks $\bar{A}$174 so when the Normalize FF is set to T11 all group select gates except 174 produce positive output signals.

The output of 174 conditions gates 66, 68, 70, 72, 74 and 76 of group borrow circuit 16F. The absence of ones in B*00, B*02, B*03 and B*05 causes gates 66, 70 72 and 76 to be blocked while the presence of a one in A*04 blocks gate 68. However, all inputs to gate 74 are negative and it produces the positive output signals F*b*. This signal is applied to FIGURE 6 where it is inverted at $\bar{O}$194 and inverted again at N206 to become the positive signal $\bar{b}$. Therefore, of the signals applied to the scale factor generator at this time only $\bar{b}$, $\bar{F}$, A, C, D and E are positive.

The signal A is positive and blocks $\bar{A}$237.

The signal D is positive causing $\bar{A}$228 to produce a negative output signal to $\bar{O}$224. The signals $\bar{C}$ and $\bar{B}$ are also negative hence $\bar{O}$224 produces a positive output signal to block $\bar{A}$238.

The signal D is positive thus causing $\bar{A}$230 to apply a negative signal $\bar{O}$225. The signal C is positive causing $\bar{A}$229 to apply a negative signal to $\bar{O}$225. The negative signals $\bar{E}$ and $\bar{B}$ condition the remaining inputs to $\bar{O}$225 and it produces a positive output signal to block $\bar{A}$239.

The signal A is negative and conditions one input of $\bar{A}$231. The signal $\bar{b}$ is positive thus causing $\bar{O}$216 to apply a negative signal to $\bar{A}$231. With both inputs negative $\bar{A}$231 produces a positive output signal. This signal is inverted at $\bar{O}$226 and conditions $\bar{A}$240.

The signal $\bar{F}$ is positive causing $\bar{O}$219 to apply a positive signal to one input of $\bar{A}$235. The signal $\bar{b}$ is positive causing $\bar{O}$220 to apply a negative signal to the other input of $\bar{A}$235. With both inputs negative $\bar{A}$235 produces a positive output signal that is inverted at $\overline{O}227$ and conditions $\overline{A}241$.

The signals $\bar{a}$, $\bar{c}$, $\bar{e}$ and $\overline{G}$ are all negative causing the output of $\overline{O}223$ to become positive and block $\overline{A}242$.

When the command Read-Out Scale Factor occurs at T15 gates 240 and 241 produce positive output signals while gates 237, 238, 239 and 242 remain blocked and continue to produce negative output signals. If a negative output is considered to represent binary one and stage 242 is considered to be the low order stage it is seen that the the value read out from the scale factor generator is 000110 which is the binary equivalent of decimal six. Therefore, the true scale factor is 36−6=30. This is correct since in the numerical example the binary one in stage $2^4$ must be left shifted thirty binary places in order to be positioned immediately to the right of the sign digit in stage $2^{35}$.

The operation of the circuits described herein is the same when generating the scale factor of a positive or a negative number. The difference lies in the value entered into X*. For a positive number its complement is entered into X*. For a negative number the negative number is entered into X* without complementing. In either event the positive absolute value of the number appears in both A* and B* after the half-subtract operation is performed.

The commands Clear X*, Clear A*B*, Enter A*B* and Read-Out Scale Factor, as well as the signals for setting and resetting the Normalizer and Zero flip-flops may be generated, for example, by a command generator of the type disclosed in copending application Serial No. 193,472, filed concurrently herewith.

The above description assumes that the negative absolute value of the number to be scaled is entered into X* and zero is entered into the A register thus causing the A*B* half-subtractor to half-subtract the complement of the negative absolute value from zero. In an alternative arrangement the negative absolute value of the number to be scaled may be entered into the A register and zero entered into X*. In this arrangement the ones complement of zero is half-subtracted from the negative absolute value of the number. The result is the same in both cases.

Furthermore, since the A*B* and main half-subtractors actually perform half-add operations and the borrow pyramid 17 actually propagates the carries produced by the A*B* half-subtractor, it will be obvious that these elements may be replaced with elements employing additive logic. Thus, the elements 7, 16, 18, 20 and 22 may be replaced with half-adders, group carry circuits, intrinsic carry circuits and final carry propagation circuits employing additive logic. Many suitable circuits of this type are well known in the art. In this case the group select circuit receives group carry enable signals from the group carry circuits and produces a signal to enable only one group to produce a group carry.

In an embodiment employing additive logic the positive absolute value of the number to be scaled is entered into either the A register or the X* register and a negative zero is entered into the other register. Consider the following example.

| | | | | | | |
|---|---|---|---|---|---|---|
| 000000 | 000000 | 000000 | 000000 | 000001 | 101010 | A |
| 111111 | 111111 | 111111 | 111111 | 111111 | 111111 | X* |
| 111111 | 111111 | 111111 | 111111 | 111110 | 010101 | A* |
| 000000 | 000000 | 000000 | 000000 | 000001 | 101010 | B* |

The values in A and X* are half-added in a half-adder to produce a series of sum digits and a series of carry digits. The sum digits are entered into A* and the carry digits are entered into B*. The contents of A* and B* are applied to the group carry circuits. Groups A through D produce group carry enable signals because A* contains ones in all stages associated with these groups. Groups E and F fail to produce group carry enables because of the presence of a zero in at least one stage of A* associated with each of these groups. This combination of group carry enable signals selects the Group E carry circuits. Note that B* contains a carry indication in the order corresponding to the highest order of the original number containing a significant digit. This is stage $2^6$. Therefore, the Group E carry circuits produce a carry from stage $2^6$. This carry and the Group E select signal are applied to the shift count generator to generate the scale factor indication.

While the novel features of the invention as applied to preferred embodiments have been described herein, it will be understood that various omissions, substitutions and changes in the form and details of the device illustrated may be made without departing from the spirit of the invention. For example, the scale factor generator 160 may be modified to produce a true binary indication of the scale factor rather than thirty-six minus the scale factor. This arrangement would be desirable in combination with a shift counter where one is subtracted from the count in the counter each time a left shift is performed. It is intended therefore to be limited only by the scope of the appended claims.

I claim:

1. In a binary device having at least a first half-adder and a pyramid for propagating the carries generated by said half-adder, said carry pyramid comprising a plurality of group carry circuits each having means responsive to said half-adder for generating group carry signals and group carry enable signals, the improvement comprising: input means for applying the absolute value of a binary number to said half-adder as a first operand and a zero value to said half-adder as a second operand; and means responsive to said group carry and group carry enable signals for generating an indication of the scale factor of said binary number.

2. The improvement as claimed in claim 1 wherein said half-adder is an additive half-adder and said input means comprises means for applying the positive absolute value of said binary number and a negative zero value to said half-adder.

3. The improvement as claimed in claim 1 wherein said half-adder is a subtractive half-adder and said input means comprises means for applying the negative absolute value of said binary number and a positive zero value to said half-adder.

4. A scale factor device comprising: half-adder means for adding the ones complement of zero to the absolute value of a binary number to produce sum digits and carry digits; first group carry circuit means responsive to said sum digits for producing carry enable signals; group select means responsive to said carry enable signals for indicating the highest order first group carry circuit means not producing a carry enable signal; second group carry circuit means responsive to said group select means and said sum and carry digits for producing carry signals; and scale factor generator means responsive to said group select means and said carry signals for producing a binary indication of the scale factor of said binary number.

5. A device for generating the scale factor of a binary number arbitrarily divided into a plurality of groups each having a plurality of digits, said device comprising: additive accumulator means for half-adding the positive absolute value of said binary number to the complement representation of a zero value to thereby develop a plurality of groups of sum digits and a plurality of groups of carry digits; a plurality of group carry circuits each including carry enable signal generating means responsive to one of said groups of sum digits and carry signal generating means responsive to a select group carry signal, one of said groups of sum digits and one of said groups of carry digits for generating a carry signal; group select means responsive to said carry enable signal generating means for producing a select group carry signal to thereby select the carry signal generating means of the highest order group carry circuit which does not generate a carry enable signal; and scale factor means responsive to said group select means and said selected carry signal generating means for producing an indication of the scale factor of said binary number.

6. In a binary device having at least a first half-subtractor and a pyramid for propagating the borrows generated by said half-subtractor, said borrow pyramid comprising a plurality of group borrow circuits each having means responsive to said half-subtractor for generating group borrow signals and group borrow enable signals, the improvement comprising: means for applying the negative absolute value of a binary number to said half-subtractor, and means responsive to said group borrow and group borrow enable signals for generating an indication of the scale factor of said binary number.

7. In a binary device having at least a first half-subtractor and a pyramid for propagating the borrows generated by said half-subtractor, said borrow pyramid comprising a plurality of group borrow circuits each having means for generating group borrow signals and means for generating group borrow enable signals, the improvement comprising: means for applying the negative absolute value of a binary number to said half-subtractor, group select means responsive to said group borrow enable signal generating means for conditioning the group borrow signal generating means corresponding to the highest order group borrow enable signal generating means which does not produce a group borrow enable signal and means responsive to said group select means and the borrow signal from said conditioned group borrow signal generating means for producing an indication of the scale factor of said binary number.

8. In a binary device having at least a first half-subtractor and a pyramid for propagating the borrows generated by said half-subtractor, said borrow pyramid comprising a plurality of group borrow circuits each having means for generating group borrow signals and means for generating group borrow enable signals, the improvement comprising: means for applying a zero value and the negative absolute value of a binary number to said half-subtractor; group select means responsive to said group borrow enable signal generating means for conditioning the group borrow signal generating means corresponding to the highest order group borrow enable signal generating means which does not produce a group borrow enable signal; means for sensing the binary order producing a group borrow signal within said conditioned group; and means responsive to said sensing means and said group select means for producing an indication of the scale factor of said binary number.

9. A device for generating the scale factor of a binary number comprising: a half-subtractor; means for applying a zero value to said half-subtractor as one operand and the negative absolute value of said binary number to said half-subtractor as a second operand, said half-subtractor producing difference digits and borrow digits; a plurality of group borrow enable circuits each responsive to a predetermined group of said difference digits for generating a group borrow enable signal when all of the difference digits of the group are zero; a group borrow circuit corresponding to each of said group borrow enable circuits, each of said group borrow circuits being responsive to a group select signal, a predetermined group of said difference digits, and a predetermined group of said borrow digits for producing a group borrow signal at one of a plurality of outputs; group select means responsive to said group borrow enable signals for applying a group select signal to the group borrow circuit corresponding to the highest order group borrow enable circuit which does not produce a group borrow enable signal; and means responsive to said group select means and the output from said selected group borrow circuit for producing an indication of the scale factor of said binary number.

10. A scale factor device comprising: half-adder means for adding the negative absolute value of a binary number to zero; first and second registers for storing the difference and borow digits generated by said half-adder; first group borrow circuit means responsive to said difference digits for producing borrow enable signals; group select means responsive to said borrow enable signals for indicating the highest order first group borrow circuit means not producing a borrow enable signal; second group borrow circuit means responsive to said group select means and said first and second register means for producing borrow signals; and scale factor generator means responsive to said group select means and said borrow signals for producing a binary indication of the scale factor of said binary number.

11. In a device including a binary accumulator wherein a plurality of group borrow circuits are provided for selectively generating group borrow signals and group borrow enable signals in response to groups of difference and borrow digits applied thereto, the improvement comprising: means responsive to said borrow enable signals for enabling the highest order group borrow signal; and scale factor means responsive to said highest order group borrow signal and said enabling means for generating the scale factor of the number represented by said difference digits.

12. The improvement as claimed in claim 7 wherein said enabling means includes means for detecting the absence of a group borrow enable signal from any of said group borrow circuits, said scale factor means being responsive to said detecting means and the absence of a group borrow signal for indicating the scale factor of said number.

13. A device for generating the scale factor of a binary number arbitrarily divided into a plurality of groups each having a plurality of digits, said device comprising: subtractive accumulator means for half-adding the negative absolute value of said binary number to a zero value to thereby develop a plurality of groups of difference digits and a plurality of groups of borrow digits; a plurality of group borrow circuits each including borrow enable signal generating means responsive to one of said groups of difference digits and borrow signal generating means responsive to a select group borrow signal, one of said groups of difference digits and one of said groups of borrow digits for generating a borrow signal; group select means responsive to said borrow enable signal generating means for selecting the borrow signal generating means of the highest order group borrow circuit which does not generate a borrow enable signal; and scale factor generator means responsive to said group select means and said selected borrow signal generating means for producing an indication of the scale factor of said binary number.

14. The combination comprising: arithmetic means for combining first and second operands, carry propagation circuits responsive to said arithmetic means and including a plurality of group carry circuits for generating group carry signals and group carry enable signals, means for applying signals representing said first and second operands to said arithmetic means, and means responsive to said group carry signals and said group carry enable signals for generating a plurality of signal representing the scale factor of one of said operands.

References Cited by the Examiner

UNITED STATES PATENTS

| | | | |
|---|---|---|---|
| 2,886,241 | 5/59 | Spaulding et al. | |
| 2,951,637 | 9/60 | Lind | 235—159 |
| 3,100,837 | 8/63 | Gesek | 235—175 |

ROBERT C. BAILEY, *Primary Examiner.*

MALCOLM A. MORRISON, *Examiner.*